(12) United States Patent
Tian et al.

(10) Patent No.: US 12,292,650 B2
(45) Date of Patent: May 6, 2025

(54) DISPLAY MODULE, SPLICING SCREEN AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Zhaoshou Tian, Beijing (CN); Dan Li, Beijing (CN); Qingshan Qu, Beijing (CN); Shanlei Hou, Beijing (CN); Hongbo Feng, Beijing (CN); Haijun Shi, Beijing (CN); Bochang Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/273,304

(22) PCT Filed: May 31, 2022

(86) PCT No.: PCT/CN2022/096224
§ 371 (c)(1),
(2) Date: Jul. 20, 2023

(87) PCT Pub. No.: WO2023/230837
PCT Pub. Date: Dec. 7, 2023

(65) Prior Publication Data
US 2024/0402535 A1    Dec. 5, 2024

(51) Int. Cl.
*G02F 1/13357* (2006.01)
*G02F 1/1333* (2006.01)

(52) U.S. Cl.
CPC .... *G02F 1/133608* (2013.01); *G02F 1/13336* (2013.01)

(58) Field of Classification Search
CPC ................. G02F 1/133608; G02F 1/13336
See application file for complete search history.

(56) References Cited

U.S. PATENT DOCUMENTS 9,467,641 B2 * 10/2016 Shimomichi ..... G02F 1/133608
10,948,756 B2 * 3/2021 Takaira ............ G02F 1/133308
(Continued)

FOREIGN PATENT DOCUMENTS

CN    102818228 A    12/2012
CN    208076883 U    11/2018
(Continued)

*Primary Examiner* — Arman B Fallahkhair
(74) *Attorney, Agent, or Firm* — Chiwin Law LLC

(57) ABSTRACT

At least one embodiment of the present disclosure provides a display module, a splicing screen and a display device, the display module includes: a backlight module and a display component, the backlight module includes a middle frame, and an edge of the middle frame is provided with a support part that is detachable; an edge of the display component is adhesively bonded to the support part through a first adhesive, and the support part is configured to support the display component, the support part can be quickly disassembled from the middle frame through an independent structural design, such that the reworkability of the display module can be greatly improved without affecting the display component, so as to reduce production cost.

13 Claims, 5 Drawing Sheets

(56) References Cited

U.S. PATENT DOCUMENTS

| | | | |
|---|---|---|---|
| 11,789,313 B2 | 10/2023 | Tong et al. | |
| 11,846,840 B2* | 12/2023 | Liu | G02F 1/133608 |
| 2014/0022483 A1 | 1/2014 | Kuo et al. | |
| 2018/0107048 A1 | 4/2018 | Lin | |
| 2023/0039801 A1* | 2/2023 | Zhang | G02F 1/133314 |
| 2023/0124477 A1* | 4/2023 | Kim | G02F 1/133531 |
| | | | 349/42 |
| 2024/0264491 A1* | 8/2024 | Hsieh | G02F 1/133311 |
| 2024/0360985 A1* | 10/2024 | Tao | G02F 1/1333 |
| 2024/0369757 A1* | 11/2024 | Zhang | G02F 1/1336 |

FOREIGN PATENT DOCUMENTS

| | | |
|---|---|---|
| CN | 211014952 U | 7/2020 |
| CN | 211699261 U | 10/2020 |
| CN | 214669977 U | 11/2021 |
| CN | 215181289 U | 12/2021 |
| CN | 215181323 U | 12/2021 |
| CN | 215494450 U | 1/2022 |
| WO | 2017177723 A1 | 10/2017 |
| WO | 2022012331 A1 | 1/2022 |

* cited by examiner

DISPLAY MODULE, SPLICING SCREEN AND DISPLAY DEVICE

TECHNICAL FIELD

Embodiments of the present disclosure relate to a display module, a splicing screen and a display device.

BACKGROUND

Display devices formed by splicing screens are more and more widely used, and a display device including a splicing screen is usually spliced by multiple independent display modules, the display module includes a display component and a backlight component. The backlight component includes a middle frame disposed on a side of the display component, and the middle frame is provided with a carrier platform that can carry the display component, and an accommodating region that can accommodate optical films such as a light guide plate, a diffusion plate, a reflector, etc. The carrier platform needs to be connected to and fixed with the non-display region of the display component through an adhesive. The backlight component includes a backplane that can support the middle frame.

SUMMARY

At least one embodiment of the present disclosure relates to a display module, a splicing screen and a display device, the support part which is detachable included in the display module is arranged at the edge of the middle frame, which is designed through an independent structure to enable the support part, the first adhesive, and the display component to be removed from the middle frame as a whole when the display module needs to be reworked, to avoid the process of using a blade to cut open the first adhesive in conventional processing, and thus avoid damage to the display panel in the display component, the reprogrammability of the display module can be greatly improved while the display component is not affected, thereby reducing the production cost of the display module.

At least one embodiment of the present disclosure provides a display module, the display module includes: a backlight module and a display component, the backlight module comprises a middle frame, and an edge of the middle frame is provided with a support part that is detachable; an edge of the display component is adhesively bonded to the support part through a first adhesive, and the support part is configured to support the display component.

For example, in the display module provided by the embodiment of the present disclosure, the support part comprises a first sub-support part close to the display component and a second sub-support part away from the display component, and has a locking hole at an edge of the middle frame, a fastener is provided between the first sub-support part and the second sub-support part, and at least a portion of the fastener is in the locking hole, the fastener is configured to connect the first sub-support part, the second sub-support part and the middle frame to each other.

For example, in the display module provided by the embodiment of the present disclosure, a whole of the first sub-support part, the second sub-support part and the fastener is a structure protruding toward a side of the middle frame.

For example, in the display module provided by the embodiment of the present disclosure, the fastener comprises a multi-point screw, and the support part and the middle frame are connected at the locking hole through the multi-point screw.

For example, in the display module provided by the embodiment of the present disclosure, the fastener comprises a countersunk screw, the countersunk screw comprises a countersunk head and a screw, and the support part and the middle frame are connected at the locking hole through the countersunk screw.

For example, in the display module provided by the embodiment of the present disclosure, the countersunk head comprises a first sub-countersunk head close to the display component and a second sub-countersunk head away from the display component; the first sub-countersunk head is in contact with a portion of a first mating surface of the first sub-support part at a position close to a first edge of the locking hole, and the first edge is an edge of the locking hole close to the display component; the second sub-countersunk head is in contact with a portion of a second mating surface of the second sub-support part at a position close to a second edge of the locking hole, and the second edge is an edge of the locking hole away from the display component.

For example, in the display module provided by the embodiment of the present disclosure, a first included angle between the first mating surface and the first sub-countersunk head is 8° to 12°, and a second included angle between the second mating surface and the second sub-countersunk head is 8° to 14°.

For example, in the display module provided by the embodiment of the present disclosure, the middle frame is in contact with a portion of a third mating surface of the first sub-support part at a position close to a first edge of the locking hole, and the first edge is an edge of the locking hole close to the display component; the middle frame is in contact with a portion of a fourth mating surface of the second sub-support part at a position close to a second edge of the locking hole, and the second edge is an edge of the locking hole away from the display component.

For example, in the display module provided by the embodiment of the present disclosure, a third included angle between the middle frame and the third mating surface is 8° to 12°; a fourth included angle between the middle frame and the fourth mating surface is 10° to 16°.

For example, in the display module provided by the embodiment of the present disclosure, the support part is connected to the middle frame through a quick-release and back-off structure.

For example, in the display module provided by the embodiment of the present disclosure, the middle frame comprises a body part and an extension part extending from an edge of the body part to a side of the display component, and the support part has an opening toward the middle frame, the extension part is snapped into the opening.

For example, in the display module provided by the embodiment of the present disclosure, the extension part has a first side and a second side opposite to each other in a direction perpendicular to an extending direction of the extension part, and at least one of the first side and the second side is provided with a buckle, and the buckle is configured to adjust a relative movement between the support part and the extension part.

For example, in the display module provided by the embodiment of the present disclosure, the buckle is elastically connected to the extension part, and the buckle pops out of the first side or the second side of the extension part, the buckle fixedly connects the support part and the extension part, and a first spacing is existed between a side of the support part close to the body part and a side of the body part close to the support part.

For example, in the display module provided by the embodiment of the present disclosure, the buckle is between the first side and the second side of the extension part, and the support part and the extension part are configured to move relatively.

For example, in the display module provided by the embodiment of the present disclosure, the display component comprises a display panel, and a backlight plate stacked with the display panel, the display panel is disposed on a side of the backlight plate away from the middle frame, and the support part and the backlight plate are adhesively bonded by the first adhesive.

For example, in the display module provided by the embodiment of the present disclosure, the backlight plate and the display panel are adhesively bonded using a transparent laser tape.

For example, the display module provided by the embodiment of the present disclosure, further comprising: a backplane, configured to support the middle frame; an optical film material, a diffuser plate and a light guide plate, disposed in an enclosed space formed by the middle frame, the display component and the backplane.

At least one embodiment of the present disclosure further provides a splicing screen, and the splicing screen comprises a plurality of display modules connected to each other, and each of the plurality of the display modules is the display module according to any one of the embodiments mentioned above.

At least one embodiment of the present disclosure further provides a display device, and the display device comprises any one of the display modules mentioned above.

BRIEF DESCRIPTION OF DRAWINGS

In order to more clearly explain the technical solutions of the embodiments of the present disclosure, the following will briefly introduce the drawings of the embodiments. Obviously, the drawings in the following description only relate to some embodiments of the present disclosure, but not limit the present disclosure.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

A size of a seam is an important indicator for evaluating the quality of a splicing screen, due to the characteristics of the splicing screen product itself, in the design scheme of the mid-to-high-end splicing screen, the display component is usually fixed by adhesive bonding, so as to minimize the seam of the splicing screen. During the normal production process of the splicing screen, issues that require rework are usually occurred. Since a display component and a middle frame are usually fixed and adhesively bonded by an UV-curable adhesive or a hot-melt adhesive, this method of adhesively bonding by an UV-curable adhesive or a hot-melt adhesive will result in very low reworkability of the splicing screen, and finally the splicing screen subjected to rework processing can only be scrapped, which will lead to serious material loss and increase the production cost of the display module.

Figure 1:
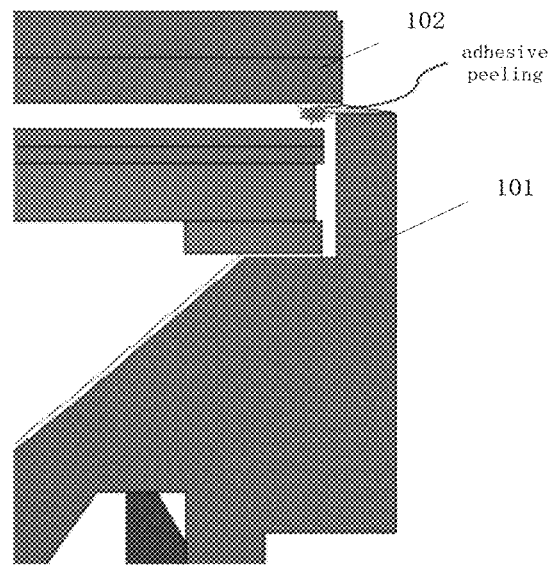
FIG. 1 is a schematic cross-sectional structure view of a display module with adhesive peeling phenomenon.

At present, a display component and a middle frame in an ultra-narrow seam splicing screen (ULFD) are bonded by an UV-curable adhesive, in the case that the display module is reworked, it is necessary to disassemble a backplane, a connector of the middle frame, and the middle frame in reverse order, while manually disassembling the middle frame outward, the probability of a display panel in the display component being broken is more than 50%, and the whole disassembly process takes more than 1 hour, resulting in inefficiency rework of the display module, and the probability of getting a good display panel after the display module being reworked is very low. In an extremely seam splicing screen (ELFD), a display panel and a backlight plate are attached for a first time with a hot-melt adhesive, and the backlight plate and a middle frame are bonded for a second time with an UV-curable adhesive, based on the second bonding, the rework needs to disassemble the backplane, a connector of the middle frame and the middle frame in reverse order, and the rework process needs to use a blade to cut the UV-curable adhesive, the process of using the blade will cause the probability of the backlight plate being scratched and the display panel being broken approach 100%, and the whole rework process takes more than 1 hour. In addition, due to the fixing method of the display component in the splicing screen and the usage characteristics of the terminal, thermal expansion will occur while the splicing screen is in normal use, the thermal expansion will lead to a high risk of adhesive peeling, which will cause high maintenance costs for the display module, and affect the life of the product. For example, FIG. 1 is a schematic view of a cross-sectional structure illustrating a display module with adhesive peeling phenomenon, as shown in FIG. 1, in the case of thermal expansion, a portion of the middle frame 101 in contact with the display component 102 moves to the right, thereby causing adhesive peeling phenomenon between the middle frame 101 and the display component 102, which makes the adhesively bonding force between the display component 102 and the middle frame 101 is weakened, and thermal expansion is also easy to cause the light guide plate, optical film material, backlight element, etc., that are disposed in the accommodation space formed by the middle frame 101 to be abnormal, which eventually leads to the structure of the entire display module being unstable and requiring rework. The middle frame 101 is an integrated structure, in the case that the middle frame 101 and the display component 102 need to be disassembled, the adhesive between the middle frame 101 and the display component 102 needs to be removed, however, in the process of removing the adhesive, it is easy to damage the display component 102 and cause the display panel included therein to be broken. Therefore, the reworkability of the display module is very poor.

The inventors of the present disclosure noticed that, a detachable support part can be provided on an edge of the middle frame of the display module, and in the case that the display module needs to be reworked, the whole of the support part and the display component can be disassembled from the middle frame, as such, there is no need to remove the adhesive for adhesively bonding the support part and the display component, which will not cause damage to the display component.

At least one embodiment of the present disclosure provides a display module, and the display module includes: a backlight module and a display component, the backlight module includes a middle frame, and an edge of the middle frame is provided with a detachable support part, an edge of the display component and the support part are adhesively bonded by a first adhesive, and the support part is configured to support the display component, in the case that the display module with the above-mentioned structural design need to be reworked, the whole of the support part, the first adhesive and the display component can be detached from the middle frame, so as to avoid the process of cutting the first adhesive with a blade in conventional processing, thereby avoiding damage to the display panel in the display component.

Figure 2:
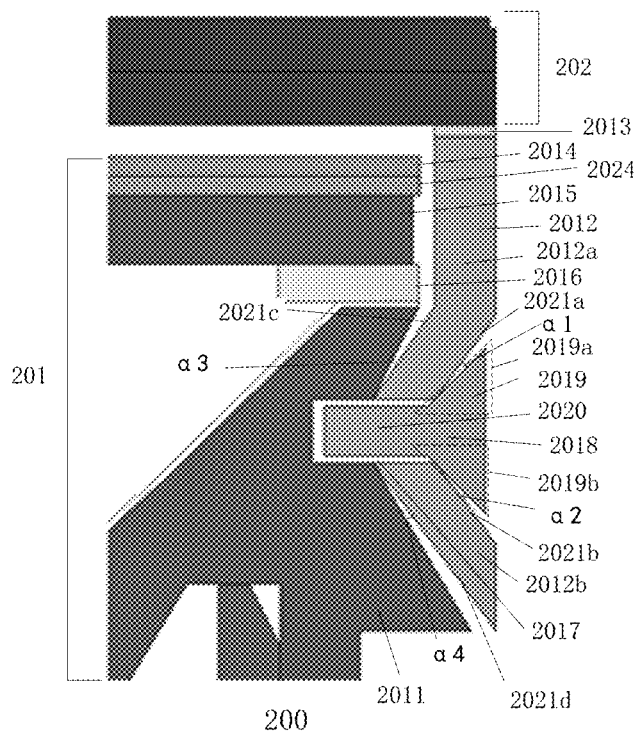
FIG. 2 is a schematic cross-sectional structure view of a display module provided by at least one embodiment of the present disclosure.

For example, FIG. 2 is a schematic cross-sectional structure view of a display module provided by at least one embodiment of the present disclosure, as shown in FIG. 2, the display module 200 includes: a backlight module 201 and a display component 202, the backlight module 201 includes a middle frame 2011, and an edge of the middle frame 2011 is provided with a detachable support part 2012, an edge of the display component 202 and the support part 2012 are adhesively bonded by a first adhesive 2013, and the support part 2012 is configured to support the display component 202. For example, the support part 2012 can be quickly disassembled from the middle frame 2011 through an independent structural design, such that the reworkability of the display module can be greatly improved without affecting the display component 202, so as to reduce production cost.

For example, after the whole of the support part 2012, the first adhesive 2013 and the display component 202 are detached from the middle frame 2011, the optical film material 2014, the diffuser plate 2015, the light guide plate 2016 are disposed in the accommodation space formed by the middle frame 2011 and other portions of the entire backlight module 201 are in an open state, so as to facilitate maintenance, replacement or cleaning of various components. The process of detaching the whole of the support part 2012, the first adhesive 2013 and the display component 202 from the middle frame 2011 will not cause the risk of damage to the display component 202, and there will be no loss of other materials as well, therefore, production cost will not be increased, and the reworkability of the display module 200 is high.

For example, in an illustrative embodiment, as shown in FIG. 2, the support part 2012 is connected to the middle frame 2011 in a local contact manner, and the support part 2012 can be deformed to a limited extent, so as to reduce the tensile stress applied to the first adhesive 2013 due to thermal expansion, thereby effectively solving the issue of adhesive peeling at the joint between the display component 202 and the backlight component 201, so that the quality of the display module can be greatly improved, and the cost of repairing the display module can be reduced, thereby improving market competitiveness.

For example, in an illustrative embodiment, as shown in FIG. 2, the support part 2012 includes a first sub-support part 2012a close to the display component 202 and a second sub-support part 2012b away from the display component 202, and has a locking hole 2017 at an edge of the middle frame 2011, a fastener 2018 is provided between the first sub-support part 2012a and the second sub-support part 2012b, and at least a portion of the fastener 2018 is in the locking hole 2017, the fastener 2018 is configured to provide fixedly connection for the first sub-support part 2012a, the second sub-support part 2012b and the middle frame 2011. The fastener 2018 can be rotated clockwise or counterclockwise to make the first sub-support part 2012a, the second sub-support part 2012b and the middle frame 2011 change from a stable connection state to a loose state, such that the first sub-support part 2012a and the second sub-support part 2012b can be separated from the middle frame 2011; accordingly, the fastener 2018 can be rotated counterclockwise or clockwise to make the first sub-support part 2012a, the second sub-support part 2012b and the middle frame 2011 change from a loose state to a stable connection state, such that the first sub-support part 2012a and the second sub-support part 2012b can be separated from the middle frame 2011.

For example, in an illustrative embodiment, the first sub-support part 2012a, the second sub-support part 2012b, and the locking hole 2017 are used in conjunction with each other. A portion of the locking hole 2017 extends into the middle frame 2011, and there has a gap between the first sub-support part 2012a and the second sub-support part 2012b, and the gap is a portion of the locking hole 2017, such that the fastener 2018 can firstly pass through the gap between the first sub-support part 2012a and the second sub-support part 2012b, and then enter the portion of the locking hole 2017 located in the middle frame 2011, and thereafter, the fastener 2018 is rotated, such that the middle frame 2011 can be fixedly connected with the first sub-support part 2012a and the second sub-support part 2012b.

For example, in an illustrative embodiment, the first sub-support part 2012a and the second sub-support part 2012b can be an integrated structure, which has a gap at the position corresponding to the locking hole 2017; the first sub-support part 2012a and the second sub-support part 2012b may also be two completely separate structures, and the first sub-support part 2012a and the second sub-support part 2012b may be fixedly connected by the fastener 2018, which are not limited in the embodiments of the present disclosure.

For example, in an illustrative embodiment, the whole of the first sub-support part 2012a, the second sub-support part 2012b and the fastener 2018 is a structure protruding toward a side of the middle frame 2011. The fastener 2018 includes a protrusion part in the portion of the locking hole 2017 that is located in the middle frame 2011.

For example, in an illustrative embodiment, the fastener 2018 includes a multi-point screw, and the support part 2012 is connected to the middle frame 2011 at the locking hole 2017 through the multi-point screw. For example, the multi-point screw can make the first sub-support part 2012a, the second sub-support part 2012b and the middle frame 2011 be connected through multiple screws at multiple positions, such that the connection between the first sub-support part 2012a, the second sub-support part 2012a and the middle frame 2011 is more stable. FIG. 2 illustrates the cross-sectional structure of the display module, in which only one screw is illustrated, and a plurality of screws may be arranged in a direction perpendicular to the paper surface and inward.

For example, as shown in FIG. 2, in an illustrative embodiment, the fastener 2018 includes a countersunk screw, and the countersunk screw includes a countersunk head 2019 and a screw 2020, the support part 2012 is connected with the middle frame 2011 at the locking hole 2017 through the countersunk screw. For example, the head of a general screw protrudes above the top of a surface of the connected object, making the surface of the connected object uneven. The countersunk head 2019 included in the countersunk screw can sink below the surface of the connected object, so that the surface of the connected object is flat.

For example, in an illustrative embodiment, the countersunk head 2019 includes a first sub-countersunk head 2019a close to the display component 202 and a second sub-countersunk head 2019b away from the display component 202, the first sub-countersunk head 2019a in in contact with a portion of a first mating surface 2021a of the first sub-support part 2012a at a position close to a first edge of the locking hole 2017, and the first edge is an edge of the locking hole 2017 close to the display component 202; the second sub-countersunk head 2019b is in contact with a portion of a second mating surface 2021b of the second sub-support part 2012b at a position close to a second edge of the locking hole 2017, and the second edge is an edge of the locking hole 2017 away from the display component 202. For example, the first sub-countersunk head 2019a and the second sub-countersunk head 2019b are axisymmetric about the central axis of the screw 2020, an edge of the first sub-countersunk head 2019a away from the screw 2020 and an edge of the second sub-countersunk head 2019b away from the screw 2020 are on the same one straight line, and the straight line is located on a side of an edge of the support part 2012 (that is farthest from the middle frame 2011) close to the screw 2020, alternatively, the straight line and the edge of the support part 2012 that is farthest from the middle frame 2011 are on the same one straight line.

For example, in an illustrative embodiment, a first included angle $\alpha 1$ between the first mating surface 2021a and the first sub-countersunk head 2019a is 8°~12°. For example, the first included angle $\alpha 1$ is 8°, 9°, 10°, 11° or 12°. A second included angle $\alpha 2$ between the second mating surface 2021b and the second sub-countersunk head 2019b is 8°~14°. For example, the second included angle $\alpha 2$ is 8°, 9°, 10°, 11°, 12°, 13° or 14°, which is not limited in the embodiments of the present disclosure. The existence of the first included angle $\alpha 1$ and the second included angle $\alpha 2$ makes the support part 2012 has a space for expansion or movement, which is not easy to cause the issue of adhesive peeling.

For example, in an illustrative embodiment, the middle frame 2011 is in contact with a portion of a third mating surface 2021c of the first sub-support part 2012a at a position close to the first edge of the locking hole 2017, and the first edge is the edge of the locking hole 2017 close to the display component 202; the middle frame 2011 is in contact with a portion of a fourth mating surface 2021d of the second sub-support part 2012b at a position close to the second edge of the locking hole 2017, and the second edge is the edge of the locking hole 2017 away from the display component 202.

For example, in an illustrative embodiment, a third included angle $\alpha 3$ between the middle frame 2011 and the third mating surface 2021c is 8°~12°; a fourth included angle $\alpha 4$ between the middle frame 2011 and the fourth mating surface 2021d is 10°~16°, for example, the third included angle $\alpha 3$ is 8°, 9°, 10°, 11° or 12°. The fourth included angle $\alpha 4$ is 8°, 9°, 10°, 11°, 12°, 13°, 14°, 15° or 16°, which is not limited in the embodiments of the present disclosure.

For example, it should be noted that, the third mating surface 2021c is a surface of the first sub-support part 2012a close to the middle frame 2011 and receiving the force applied from the middle frame 2011, and the fourth mating surface 2021d is a surface of the second sub-support part 2012b close to the middle frame 2011 and receiving the force applied from the middle frame 2011. The position where the third mating surface 2021c is in contact with the middle frame 2011 may be a point or a short line in the cross-sectional view, and a portion of the third mating surface 2021c is not in contact with other structures, so as to leave a certain expansion space between the middle frame 2011 and the first sub-support 2012a. The position where the fourth mating surface 2021d is in contact with the middle frame 2011 may be a point or a short line in the cross-sectional view, and a portion of the fourth mating surface 2021d is not in contact with other structures, so as to leave a certain expansion space between the middle frame 2011 and the second sub-support part 2012b.

For example, in FIG. 2, the arrangement of the above-mentioned first included angle $\alpha 1$, second included angle $\alpha 2$, third included angle $\alpha 3$ and fourth included angle $\alpha 4$ can ensure that, during the subsequent temperature rise stage while using the display device formed based on the display module, in the case that the display component 202 is heated and shrinks while the backlight element is heated and expanded to generate a relative displacement, the support part 2012 can rotate inward within a certain limited range, such that the first included angle $\alpha 1$ increases and the third included angle $\alpha 3$ decreases; and the fourth included angle $\alpha 4$ increases and the second included angle $\alpha 2$ decreases, the first adhesive 2013 between the edge of the display component 202 and the support part 2012 is subject to a tensile stress due to the relative movement, which makes the thickness of the first adhesive 2013 at the side close to the light guide plate 2016 become larger, and the thickness of the first adhesive 2013 at the side away from the light guide plate 2016 becomes smaller, thereby preventing the phenomenon of adhesive peeling from being occurred between the display component 202 and the support part 2012, so as to ensure the quality of the display module, and improve the service life of the display module. In addition, the above design can also minimize the restrictive effect of the fastener 2018 on the support part 2012.

Figure 3:
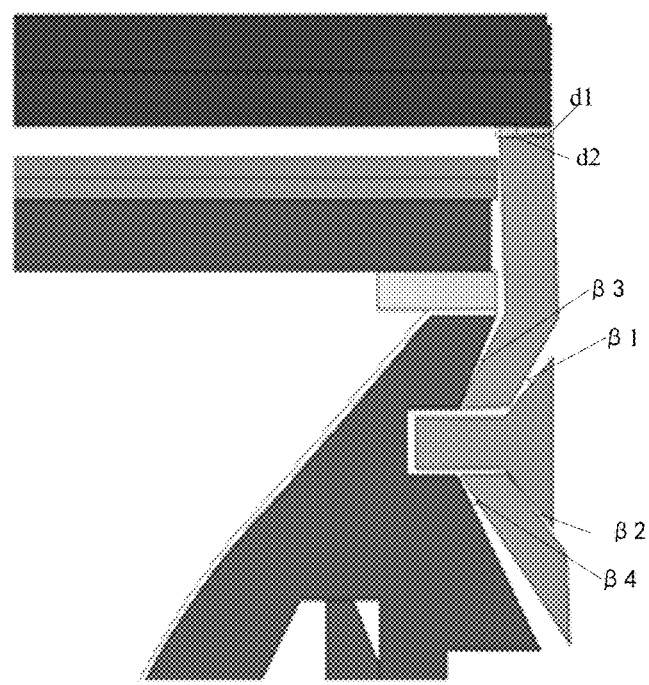
FIG. 3 is a schematic cross-sectional structure view illustrating the display module of FIG. 2 after a support part included therein being rotated inward.

For example, FIG. 3 is a schematic cross-sectional structure view illustrating the display module of FIG. 2 after the support part thereof being rotated inwardly. As shown in FIG. 3, the first included angle α1 in FIG. 2 increases to an included angle β1 in FIG. 3, the third included angle α3 in FIG. 2 decreases to an included angle β3 in FIG. 3; and the fourth included angle α4 in FIG. 2 increases to an included angle β4 in FIG. 3, the second included angle α2 in FIG. 2 decreases to an included angle β2 in FIG. 3, the first adhesive 2013 between the edge of the display component 202 and the support part 2012 is subjected to a tensile stress due to the relative movement, which makes the thickness d2 of the first adhesive 2013 at the side close to the light guide plate 2016 becomes larger, and the thickness d1 of the first adhesive 2013 at the side away from the light guide plate 2016 becomes smaller, that is, d1 is smaller than d2, thereby preventing the phenomenon of adhesive peeling from being occurred between the display component 202 and the support part 2012, and the quality of the display module is ensured.

For example, in the case that the subsequently formed splicing screen is subject to lateral compressive force during the transportation and in the terminal splicing state, the support part 2012 can also absorb the tensile stress through limited deformation, so as to avoid adhesive peeling from being occurred between the display component 202 and the support part 2012.

Figure 4:
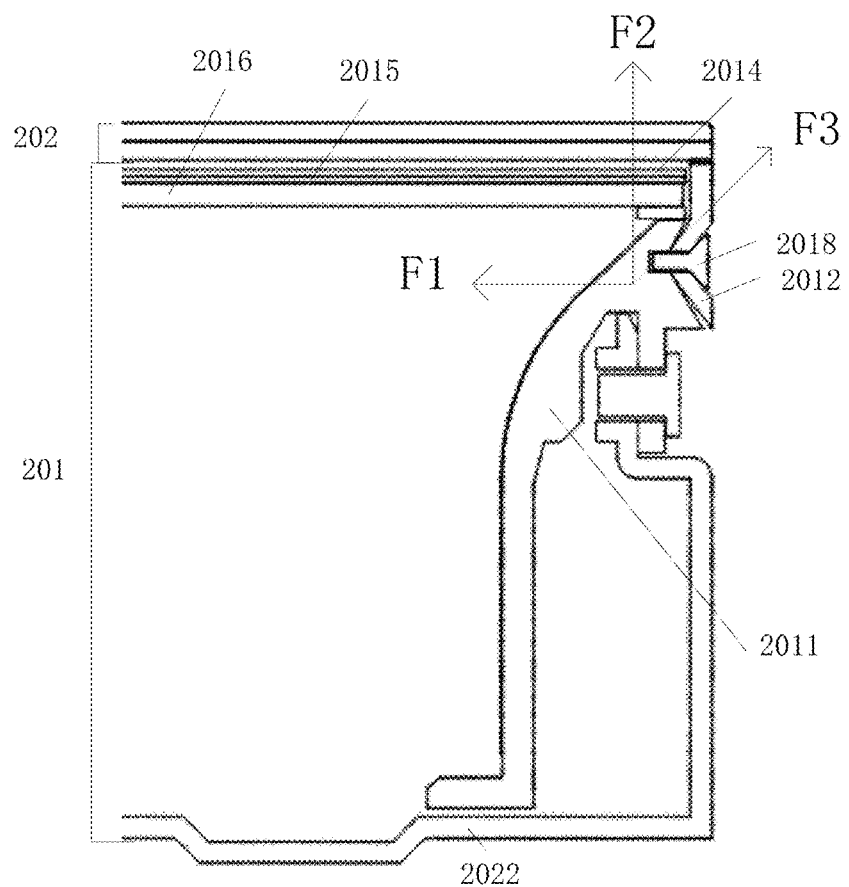
FIG. 4 is a schematic view illustrating a stressed state of a middle frame provided by at least one embodiment of the present disclosure.

For example, FIG. 4 is a schematic view illustrating a stressed state of a middle frame provided by at least one embodiment of the present disclosure, as shown in FIG. 4, the display module 200 further includes a backplane 2022, and the backplane 2022 is configured to support the middle frame 2011, the optical film material 2014, the diffuser plate 2015 and the light guide plate 2016 are disposed in an enclosed space formed by the middle frame 2011, the display component 202 and the backplane 2022, referring to FIG. 2 and FIG. 4, the optical film material 2014 is adhesively bonded to the diffuser plate 2015 through the second adhesive 2024.

For example, as shown in FIG. 4, after the middle frame 2011 and the support part 2012 are locked by the fastener 2018, the middle frame 2011 is subjected to a force F1 applied from the fastener 2018, and the middle frame 2011 is subjected to forces F2 and F3 respectively applied from the bottom plate and the side plate due to being supported by the bottom plate and the side plate of the backplane 2022, therefore, a triangular stressed structure will be formed for the middle frame 2011, and the triangular stressed state is a firm stressed model, which can ensure to the greatest extent that the architecture of the display module is not deformed while the middle frame 2011 is subjected to a horizontally inward compressive stress.

Figure 5:
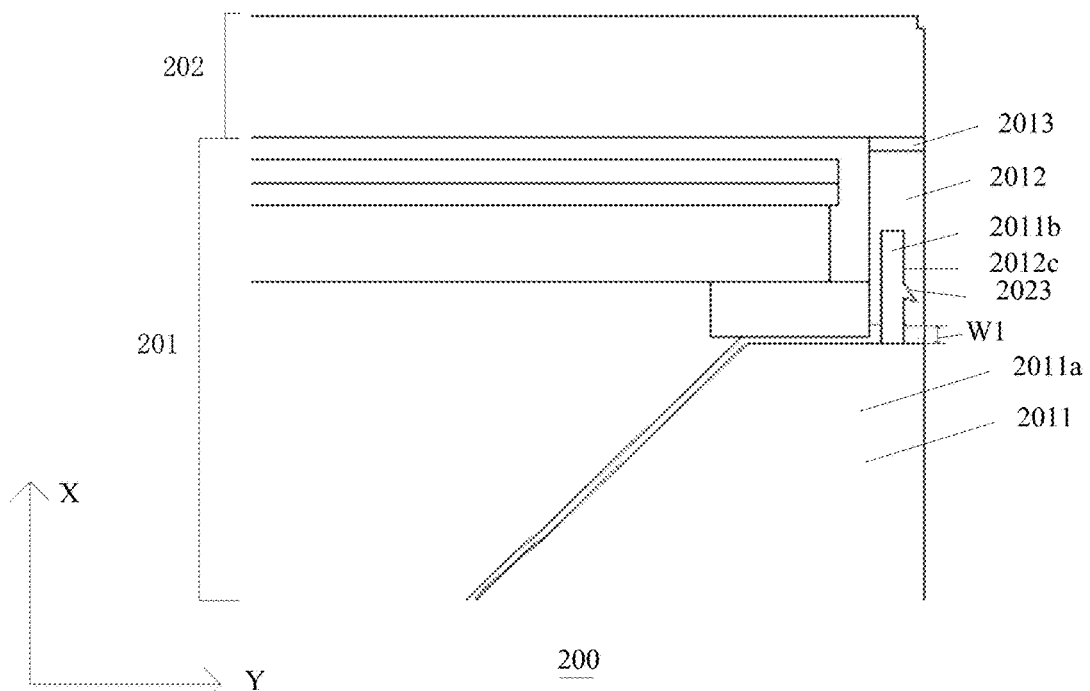
FIG. 5 is a schematic cross-sectional structure view of another display module provided by at least one embodiment of the present disclosure.

For example, FIG. 5 is a schematic cross-sectional view of another display module provided by at least one embodiment of the present disclosure. As shown in FIG. 5, the display module 200 includes: a backlight module 201 and a display component 202, the backlight module 201 includes a middle frame 2011, and an edge of the middle frame 2011 is provided with a detachable support part 2012, the edge of the display component 202 and the support part 2012 are adhesively bonded by a first adhesive 2013, and the support part 2012 is configured to support the display component 202. For example, the support part 2012 is designed through an independent structure, that is, the support part 2012 and the middle frame 2011 are connected by a quick-release and back-off structure, such that the support part 2012 can be quickly disassembled from the middle frame 2011, thereby greatly improving the reworkability of the display module and reducing the production cost of the display module under the premise that the display component 202 is not affected.

For example, as shown in FIG. 5, the middle frame 2011 includes a body part 2011a and an extension part 2011b extending from an edge of the body part 2011a to a side of the display component 202, the support part 2012 has an opening 2012c toward the middle frame 2011, and the extension part 2011b is snapped into the opening 2012c, and the extension part 2011b and the support part 2012 are stably connected by snapping the extension part 2011b through the opening 2012c.

For example, as shown in FIG. 5, the extending direction of the extension part 2011b is a first direction X, and a direction perpendicular to the first direction X is a second direction Y, the extension part 2011b has a first side and a second side opposite to each other in the second direction Y perpendicular to the extending direction thereof, at least one of the first side and second side is provided with a buckle 2023, and the buckle 2023 is configured to adjust the relative movement between the support part 2012 and extension part 2011b. That is, the buckle 2023 may be provided only on the first side, or the buckle 2023 may be provided only on the second side, or buckles 2023 may be provided both on the first side and the second side. In the case that both the first side and the second side are provided with the buckles 2023, the two buckles 2023 need to be arranged symmetrically, and the spacings between the two buckles 2023 and the body part 2011a are equal, and the arrangement of the two buckles 2023 can make the connection between the support part 2012 and the extension part 2011b more stable.

For example, in an illustrative embodiment, the buckle 2023 is elastically connected to the extension part 2011b, and the buckle 2023 pops out of the first side or the second side of the extension part 2011b, that is, in the case that the buckle 2023 protrudes from the first side or protrudes from the second side, the buckle 2023 fixedly connects the support part 2012 and the extension part 2011b, and there is a first spacing W between the side of the support part 2012 close to the body part 2011a and the side of the body part 2011a close to the support part 2012. The first spacing W1 is existed such that, in the case that the support part 2012 needs to be disassembled from the extension part 2011b, the support part 2012 can be moved to the side close to the body part 2011a while the buckle 2023 is compressed into the extension part 2011b.

For example, in an illustrative embodiment, the cross-sectional shape of the buckle 2023 is triangle. For example, the cross-sectional shape of the buckle 2023 is a right triangle, and the hypotenuse of the buckle 2023 is in contact with the support part 2012, as such, in the case that the support part 2012 moves to the side close to the body part 2011a, the hypotenuse of the buckle 2023 is subjected to a stress applied from the support part 2012, the two sides constituting the right-angle of the buckle 2023 are gradually compressed into the extension part 2011*b*. That is, the first spacing W1 enables the support part 2012 to move toward the side close to the body part 2011*a*, such that the two sides constituting the right-angle of the buckle 2023 are compressed to a location between the first side and the second side of the extension part 2011*b*, finally, the extension direction of the hypotenuse of the buckle 2023 is parallel to the first direction X, and at this time, the support part 2012 and the extension part 2011*b* can relatively move freely in the first direction X.

Figure 6A:
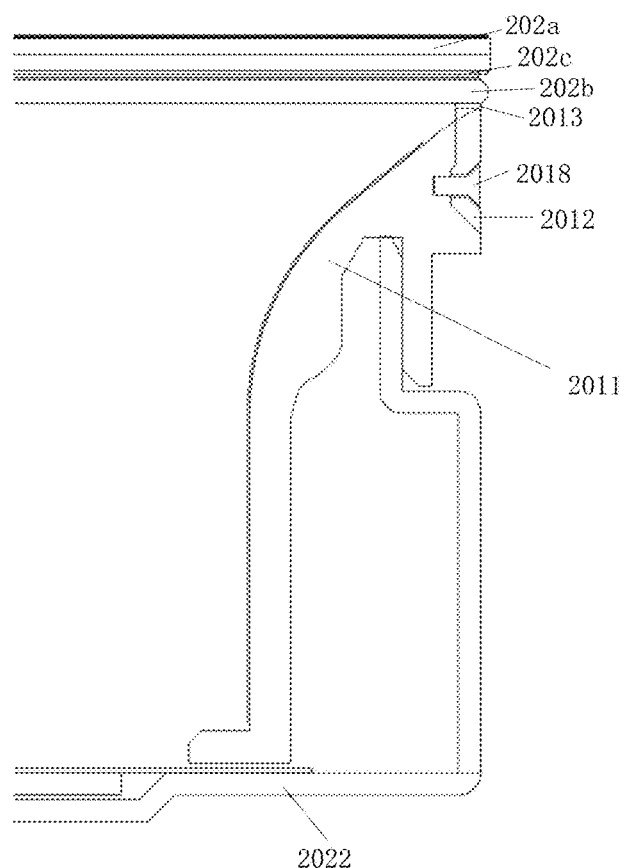
FIG. 6A is a schematic cross-sectional structure view of still another display module provided by at least one embodiment of the present disclosure.

For example, FIG. 6A is a schematic cross-sectional structure view of another display module provided by at least one embodiment of the present disclosure. As shown in FIG. 6A, the display component 202 includes a display panel 202*a*, and a backlight plate 202*b* stacked with the display panel 202*a*, the display panel 202*a* is disposed on a side of the backlight plate 202*b* away from the middle frame 2011, and the first adhesive 2013 adhesively bonds the support part 2012 to the backlight plate 202*b*. For example, a diffusion material is dispersed in the backlight plate 202*b*, such that the backlight plate 202*b* can diffuse light incident thereon, and the backlight plate 202*b* can further support the display panel 202*a*.

For example, the display panel 202*a* includes an array substrate, a color filter substrate, and a liquid crystal layer sandwiched between the array substrate and the color filter substrate. The structure and function of the display panel can refer to conventional designs, which are not limited in the embodiments of the present disclosure.

For example, in an illustrative embodiment, the backlight plate 202*b* and the display panel 202*a* are adhesively bonded together using a transparent laser tape 202*c*. The transparent laser tape 202*c* can realize fixed connection and quick disassembly of the backlight plate 202*b* and the display panel 202*a*, and the rework time of the display module is short, and the rework time is about 5 minutes. In the case that the backlight plate 202*b* or the backlight component is in a defective state, the backlight plate 202*b* and the display panel 202*a* can be disassembled without affecting the overall structure of the display panel 202*a*.

Figure 6B:
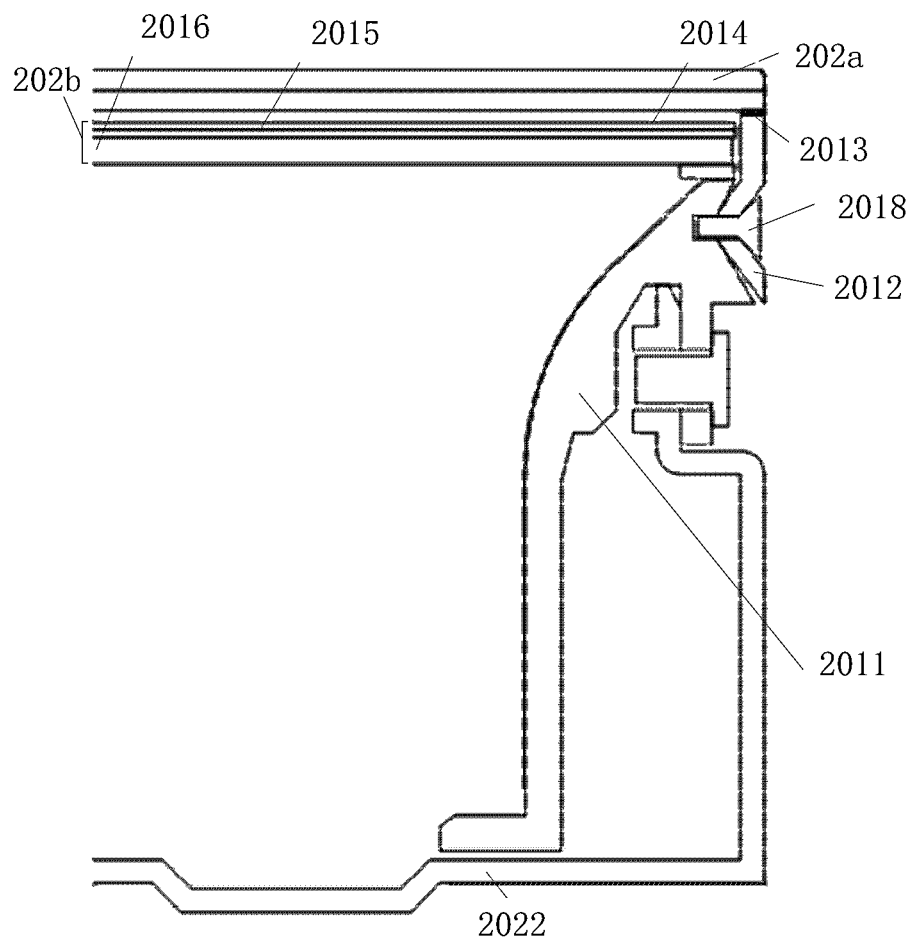
FIG. 6B is a schematic cross-sectional structure view of still another display module provided by at least one embodiment of the present disclosure.

For example, FIG. 6B is a schematic cross-sectional structure view of another display module provided by at least one embodiment of the present disclosure, as shown in FIG. 6B, the display component 202 includes a display panel 202*a*, and the display panel 202*a* is disposed on a side of the backlight plate 202*b* away from the middle frame 2011, and the first adhesive 2013 adhesively bonds the support part 2012 to the display panel 202*a*. The backlight panel 202*b* includes the aforementioned optical film material 2014, diffuser plate 2015 and light guide plate 2016.

Figure 7:
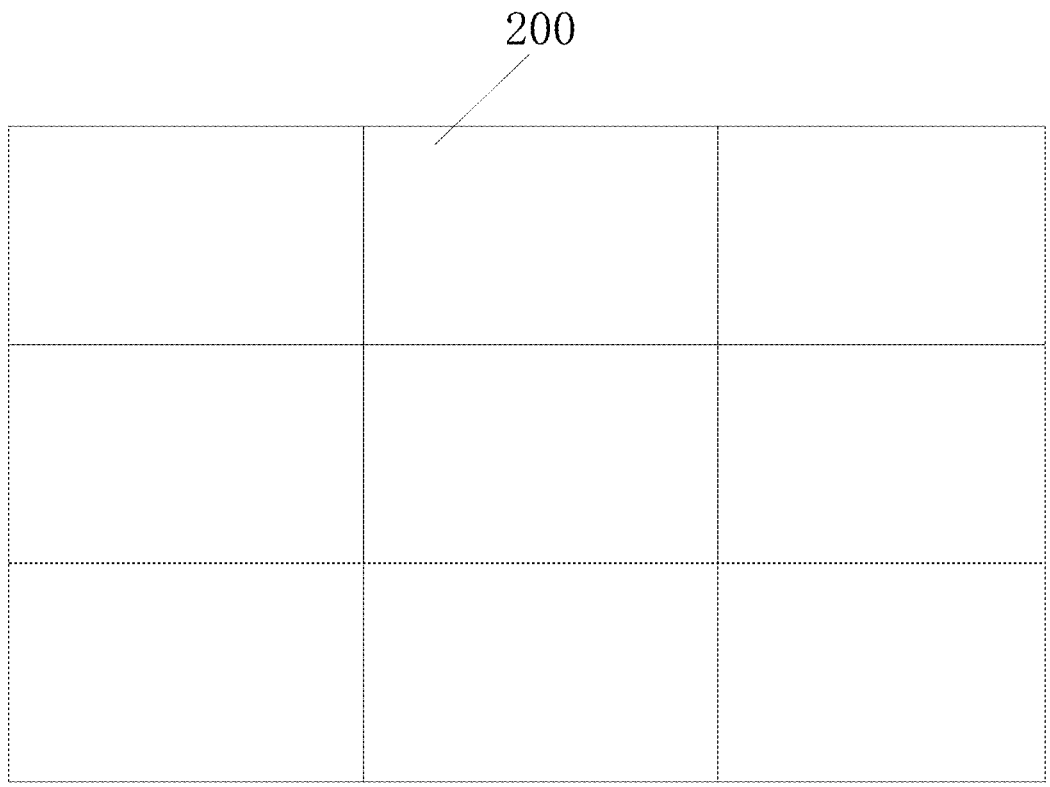
FIG. 7 is a schematic plan view of a splicing screen provided by at least one embodiment of the present disclosure.

At least one embodiment of the present disclosure further provides a splicing screen, which includes a plurality of display modules connected to each other, and the display modules may be selected from any one of above-described embodiments. For example, FIG. 7 is a schematic plan view of a splicing screen provided by at least one embodiment of the present disclosure, as shown in FIG. 7, the splicing screen 30 includes a plurality of display modules 200 provided by any one of the above-described embodiments, although FIG. 7 illustrates that the splicing screen 30 is formed by splicing nine display modules 200, the embodiments of the present disclosure are not limited thereto, and the number of the display modules 200 may also be other number, for example, the number of the display module 200 is 2, 4, 6, 12 and so on. The plurality of display modules 200 are spliced with each other, and a seam is formed between any two adjacent display modules 200. In some illustrative embodiments, the display module 200 may be a liquid crystal display module, an organic light emitting diode (OLED) display module or an electrophoretic display module.

Figure 8:
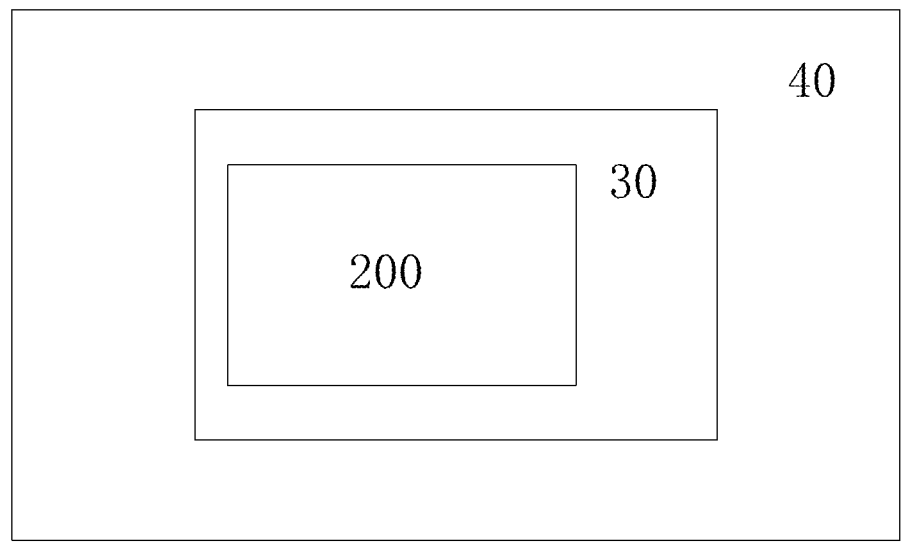
FIG. 8 is a block view of a display device provided by at least one embodiment of the present disclosure.

At least one embodiment of the present disclosure further provides a display device, for example, FIG. 8 is a block view of a display device provided by at least one embodiment of the present disclosure, as shown in FIG. 8, the display device 40 includes a plurality of display modules 200 provided by any of the above-described embodiments, and the display device 40 further includes a splicing screen 30 formed by splicing the plurality of display modules 200. The display device in the embodiments of the present disclosure may be any product or component with display function, such as a displayer, an OLED panel, an OLED television, an electronic paper, a mobile phone, a tablet computer, a notebook computer, a digital photo frame, a navigator, or the like.

The display module, the splicing screen and the display device provided by at least one embodiment of the present disclosure have at least one of the following beneficial technical effects:

(1) In the display module provided by at least one embodiment of the present disclosure, the support part can be quickly disassembled from the middle frame through an independent structural design, such that the reworkability of the display module can be greatly improved to reduce the production cost, on the premise that the display component is not affected.

(2) In the display module provided by at least one embodiment of the present disclosure, in the case that the display module needs to be reworked, the whole of the support part, the first adhesive and the display component can be detached from the middle frame, so as to avoid the process of cutting off the first adhesive with a blade in conventional processing, thereby avoiding damage to the display panel in the display component.

(3) In the display module provided by at least one embodiment of the present disclosure, after the whole of the support part, the first adhesive, and the display component are detached from the middle frame, the optical film material, the diffuser plate, and the light guide plate disposed in the accommodation space formed by the middle frame and other portions of the entire backlight module are in an open state, so as to facilitate maintenance, replacement or cleaning of various components.

(4) In the display module provided by at least one embodiment of the present disclosure, the support part and the middle frame are connected in a local contact manner, and the support part can be deformed to a limited extent, so as to reduce the tensile stress applied to the first adhesive due to thermal expansion, thereby effectively solving the issue of adhesive peeling at the joint between the display component and the backlight component, such that the quality of the display module can be greatly improved, and the cost of repairing the display module can be reduced, thereby improving market competitiveness.

The following points need to be explained:

(1) In the drawings of the embodiment of the present disclosure, only the structure related to the embodiment of the present disclosure is involved, and other structures can refer to the general design.

(2) For clarity, in the accompanying drawings used to describe the embodiments disclosed herein, the thickness of the layers or regions is enlarged or reduced, meaning that these drawings are not drawn to actual proportions.

(3) Without conflict, the embodiments of the present disclosure and the features in the embodiments may be combined with each other to obtain new embodiments.

What has been described above is only an exemplary embodiment of the present disclosure, and is not used to limit the protection scope of the present disclosure, which is determined by the appended claims.

The invention claimed is:

1. A display module comprising: a backlight module and a display component, wherein the backlight module comprises a middle frame, and an edge of the middle frame is provided with a support part that is detachable; an edge of the display component is adhesively bonded to the support part through a first adhesive, and the support part is configured to support the display component, wherein the support part comprises a first sub-support part close to the display component and a second sub-support part away from the display component, and has a locking hole at an edge of the middle frame, a fastener is provided between the first sub-support part and the second sub-support part, and at least a portion of the fastener is in the locking hole, the fastener is configured to connect the first sub-support part, the second sub-support part and the middle frame to each other.

2. The display module according to claim 1, wherein the fastener comprises a countersunk screw, the countersunk screw comprises a countersunk head and a screw, and the support part and the middle frame are connected at the locking hole through the countersunk screw.

3. The display module according to claim 2, wherein
the countersunk head comprises a first sub-countersunk head close to the display component and a second sub-countersunk head away from the display component;
the first sub-countersunk head is in contact with a portion of a first mating surface of the first sub-support part at a position close to a first edge of the locking hole, and the first edge is an edge of the locking hole close to the display component;
the second sub-countersunk head is in contact with a portion of a second mating surface of the second sub-support part at a position close to a second edge of the locking hole, and the second edge is an edge of the locking hole away from the display component.

4. The display module according to claim 3, wherein a first included angle between the first mating surface and the first sub-countersunk head is 8° to 12°, and a second included angle between the second mating surface and the second sub-countersunk head is 8° to 14°.

5. The display module according to claim 1, wherein
the middle frame is in contact with a portion of a third mating surface of the first sub-support part at a position close to a first edge of the locking hole, and the first edge is an edge of the locking hole close to the display component;
the middle frame is in contact with a portion of a fourth mating surface of the second sub-support part at a position close to a second edge of the locking hole, and the second edge is an edge of the locking hole away from the display component.

6. The display module according to claim 5, wherein a third included angle between the middle frame and the third mating surface is 8° to 12°; a fourth included angle between the middle frame and the fourth mating surface is 10° to 16°.

7. The display module according to claim 1, wherein the display component comprises a display panel, and a backlight plate stacked with the display panel, the display panel is disposed on a side of the backlight plate away from the middle frame, and the support part and the backlight plate are adhesively bonded by the first adhesive.

8. The display module according to claim 7, wherein the backlight plate and the display panel are adhesively bonded using a transparent laser tape.

9. The display module according to claim 1, wherein a whole of the first sub-support part, the second sub-support part and the fastener is a structure protruding toward a side of the middle frame.

10. The display module according to claim 1, wherein the fastener comprises a multi-point screw, and the support part and the middle frame are connected at the locking hole through the multi-point screw.

11. The display module according to claim 1, further comprising:
a backplane, configured to support the middle frame;
an optical film material, a diffuser plate and a light guide plate, disposed in an enclosed space formed by the middle frame, the display component and the backplane.

12. A splicing screen, comprising a plurality of display modules connected to each other, and each of the plurality of the display modules is the display module according to claim 1.

13. A display device, comprising the display module according to claim 1.

* * * * *